US012434979B2

(12) United States Patent
Zhu et al.

(10) Patent No.: US 12,434,979 B2
(45) Date of Patent: Oct. 7, 2025

(54) PREPARATION METHOD FOR ELECTRONIC-GRADE COPPER CHLORIDE DIHYDRATE

(71) Applicant: Dongjiang Environmental Company Limited, Guangdong (CN)

(72) Inventors: Junqiang Zhu, Guangdong (CN); Huiqian Wang, Guangdong (CN); Qiuqi Liu, Guangdong (CN); Wenbin Xu, Guangdong (CN); Long Chen, Guangdong (CN); Zengmeng Yu, Guangdong (CN)

(73) Assignee: Dongjiang Environmental Company Limited, Guangdong (CN)

( * ) Notice: Subject to any disclaimer, the term of this patent is extended or adjusted under 35 U.S.C. 154(b) by 204 days.

(21) Appl. No.: 17/918,364

(22) PCT Filed: Dec. 29, 2020

(86) PCT No.: PCT/CN2020/140793
§ 371 (c)(1),
(2) Date: Oct. 12, 2022

(87) PCT Pub. No.: WO2022/141045
PCT Pub. Date: Jul. 7, 2022

(65) Prior Publication Data
US 2023/0322575 A1 Oct. 12, 2023

(51) Int. Cl.
*C01G 3/05* (2006.01)
(52) U.S. Cl.
CPC ............ *C01G 3/05* (2013.01); *C01P 2002/72* (2013.01); *C01P 2004/03* (2013.01)
(58) Field of Classification Search
None
See application file for complete search history.

(56) References Cited

U.S. PATENT DOCUMENTS 4,545,972 A   10/1985   Ochs

FOREIGN PATENT DOCUMENTS

CN          1994890 A      7/2007
CN        101691240 A      4/2010
(Continued)

OTHER PUBLICATIONS

CN 104925847 A machine translation (Year: 2015).*
(Continued)

*Primary Examiner* — Michael Forrest
*Assistant Examiner* — Nicole Lee Quist
(74) *Attorney, Agent, or Firm* — Bayramoglu Law Offices LLC

(57) ABSTRACT

The present disclosure relates to the technical field of preparation of copper chloride, and in particular to a method of preparing an electronic-grade copper chloride dihydrate, which mainly includes the following steps: dissolving a copper salt in a first hydrochloric acid solution to obtain a copper salt solution; performing two solid-liquid separations for the copper salt solution to obtain a filtrate; wherein, the two solid-liquid separations do not have sequence and include an adhesive separation and a co-precipitation separation; the adhesive separation is a solid-liquid separation performed by adding a waste PCB board powder and continuously stirring; the co-precipitation separation is a solid-liquid separation performed by adding tin chloride compound and continuously stirring; adding a second hydrochloric acid into the filtrate and adjusting pH and then performing evaporation concentration to a supersaturated solution, adding copper chloride seed crystal and then performing cooling crystallization and centrifugal separation.

10 Claims, 4 Drawing Sheets

(56) References Cited

FOREIGN PATENT DOCUMENTS

| | | | |
|---|---|---|---|
| CN | 104925847 A | * | 9/2015 |
| CN | 106379928 A | | 2/2017 |
| KR | 100380031 B1 | | 4/2003 |

OTHER PUBLICATIONS

Tian et al., "From waste epoxy resins to efficient oil/water separation materials via a microwave assisted pore-forming strategy", Materials Horizons, 2019, 6, 1733-1739 (Year: 2019).*
International Search Report of PCT/CN2020/140793.
Written Opinion of PCT/CN2020/140793.

* cited by examiner

Dissolving a copper salt in a first hydrochloric acid solution to obtain a copper salt solution;

Performing two solid-liquid separations for the copper salt solution to obtain a filtrate; where the two solid-liquid separations do not have sequence and include an adhesive separation and a co-precipitation separation; the adhesive separation is a solid-liquid separation performed by adding a waste PCB board powder and continuously stirring; the co-precipitation separation is a solid-liquid separation performed by adding tin chloride compound and continuously stirring, and the co-precipitation separation proceeds in a water bath of 60℃ to 90℃;

Adding a second hydrochloric acid into the filtrate and adjusting pH to 0.1 to 2.5 and then performing evaporation concentration to a supersaturated solution, adding copper chloride seed crystal and then performing cooling crystallization and centrifugal separation to obtain an electronic-grade copper chloride dihydrate product.

FIG.4

PREPARATION METHOD FOR ELECTRONIC-GRADE COPPER CHLORIDE DIHYDRATE

CROSS-REFERENCE TO RELATED APPLICATION

This Application is a national stage application of PCT/CN2020/140793. This application claims priorities from PCT Application No. PCT/CN2020/140793, filed Dec. 29, 2020, the content of which is incorporated herein in the entirety by reference.

TECHNICAL FIELD

The present disclosure relates to the technical field of preparation of copper chloride, and in particular to a method of preparing an electronic-grade copper chloride dihydrate.

BACKGROUND

Copper chloride is mainly used as a catalyst for organic chemical reactions, as a mordant agent or dye colorant in the printing industry, a deodorizing, desulfurizing and purifying agent in the petroleum industry, and an electroplating copper ion-increasing additive in the electroplating industry, and so on. Therefore, it is an important and widely used copper salt product.

A high purity and low impurity copper chloride dihydrate can be prepared using two methods. In a first method, an electroplating copper powder, as a raw material, is added to a mixed solution of hydrochloric acid and water, introduced with chlorine gas as a reaction agent, concentrated and cooled for crystallization, and then dehydrated by centrifugation. This method has a high production efficiency and the prepared product is homogeneous and stable. But, because of use of chlorine gas as raw material, the first method has disadvantages such as high equipment requirement, large potential risk, long production flow, high raw material cost and low process applicability. In a second method, copper oxide or another copper salt (copper hydroxide, basic copper carbonate, basic copper chloride), as a raw material, is added to hydrochloric acid and then mixed to full dissolution, is subjected to impurity removal, to solid-liquid separation, to concentration crystallization and then to centrifugal separation so as to obtain a copper chloride product. However, this method has a high requirement for raw material, which is not favorable for impurity limit control.

The patent CN104925847A discloses a crystallization preparation method of a high purity copper chloride dihydrate, which uses an activated charcoal to remove oils and impurities. However, this method has disadvantages of high impurity removal cost, difficulty of activated charcoal regeneration and inability to remove heavy metal ion impurities.

The patent CN1840738A discloses a refining method of a copper chloride spent etching solution and a refined copper chloride solution, where a strongly or weakly basic anion exchange resin can reduce zinc and iron in the copper chloride etching solution to 1 mg·kg$^{-1}$. However, in this process, resin cleaning can produce a large amount of wastewater, increasing investment costs.

Therefore, nowadays, the preparation of the copper chloride dihydrate has the following problems:
(1) heavy metal ions cannot be effectively removed or removed with high investment; and
(2) raw material cost is high, equipment requirements are high, process flow is long and complex, and the process applicability is not high.

SUMMARY

In order to address the shortcomings of the prior art, the present disclosure provides a method of preparing an electronic-grade copper chloride dihydrate, where with a copper salt as a raw material, trace heavy metal ions and water-insoluble substances are removed from the copper salt by two-step solid-liquid separation and then concentration crystallization is performed to prepare an electronic-grade copper chloride dihydrate with a purity of up to 99%. The entire process features simple operation, low cost, less environmental pollution, and is applicable to industrialization.

The above technical object of the present disclosure is mainly achieved by the following technical solution. There is provided a method of preparing an electronic-grade copper chloride dihydrate, which includes the following steps:
(1) dissolving a copper salt in a first hydrochloric acid solution to obtain a copper salt solution;
(2) performing two solid-liquid separations for the copper salt solution to obtain a filtrate; where, the two solid-liquid separations do not have sequence and include an adhesive separation and a co-precipitation separation; the adhesive separation is a solid-liquid separation performed by adding a waste PCB board powder and continuously stirring, and the waste PCB board powder includes epoxy resin; the co-precipitation separation is a solid-liquid separation performed by adding tin chloride compound and continuously stirring, and the co-precipitation separation proceeds in a water bath of 60° C. to 90° C.;
(3) adding a second hydrochloric acid into the filtrate and adjusting pH to 0.1 to 2.5 and then performing evaporation concentration to a supersaturated solution, adding copper chloride seed crystal and then performing cooling crystallization and centrifugal separation to obtain an electronic-grade copper chloride dihydrate product.

Preferably, the copper salt is at least one of copper oxide, copper hydroxide, basic copper chloride and basic copper carbonate.

Preferably, a mass concentration of the first hydrochloric acid is 5.0% to 30.0%.

Preferably, a molar ratio of the hydrochloric acid to the copper salt is 1.70 to 2.30:1.

Preferably, a metal content of the waste PCB board powder is lower than 0.1 mg/kg, and an addition amount of the waste PCB board powder is 0.5% to 12% of the mass of the copper salt dissolved in the first hydrochloric acid.

Preferably, the addition amount of the tin chloride compound is 0.1% to 2% of the mass of the copper salt dissolved in the first hydrochloric acid, and the tin chloride compound is at least one of $SnCl_4$ and $SnCl_2$.

Preferably, an evaporation temperature is 65° C. to 95° C. when the filtrate is concentrated to the supersaturated solution.

Preferably, the addition amount of the copper chloride seed crystal is 1% to 18% of the mass of the copper salt dissolved in the first hydrochloric acid.

Preferably, after the copper chloride seed crystal is added, the supersaturated solution is cooled down to 5° C. to 50° C. with a cooling time no less than 2 h.

Preferably, a rotation speed of the centrifugal separation is 800 to 4000 r/m.

The above method of preparing an electronic-grade copper chloride dihydrate has the following benefits.

Firstly, the waste PCB board powder is used to remove water-insoluble substances in the solution and filter it to obtain a filtrate with a turbidity less than 20 NTU, thus realizing a waste-against-waste process.

Secondly, the tin chloride compound is used to remove trace heavy metal ions such as cadmium, iron and nickel in the solution without introducing impurities.

Thirdly, the method has the advantages of simple preparation process, low cost, less environmental pollution and is applicable to industrialization.

BRIEF DESCRIPTIONS OF THE DRAWINGS

FIG. 4 is a flowchart of a process of the present disclosure.

DETAILED DESCRIPTIONS OF EMBODIMENTS

Figure 1:
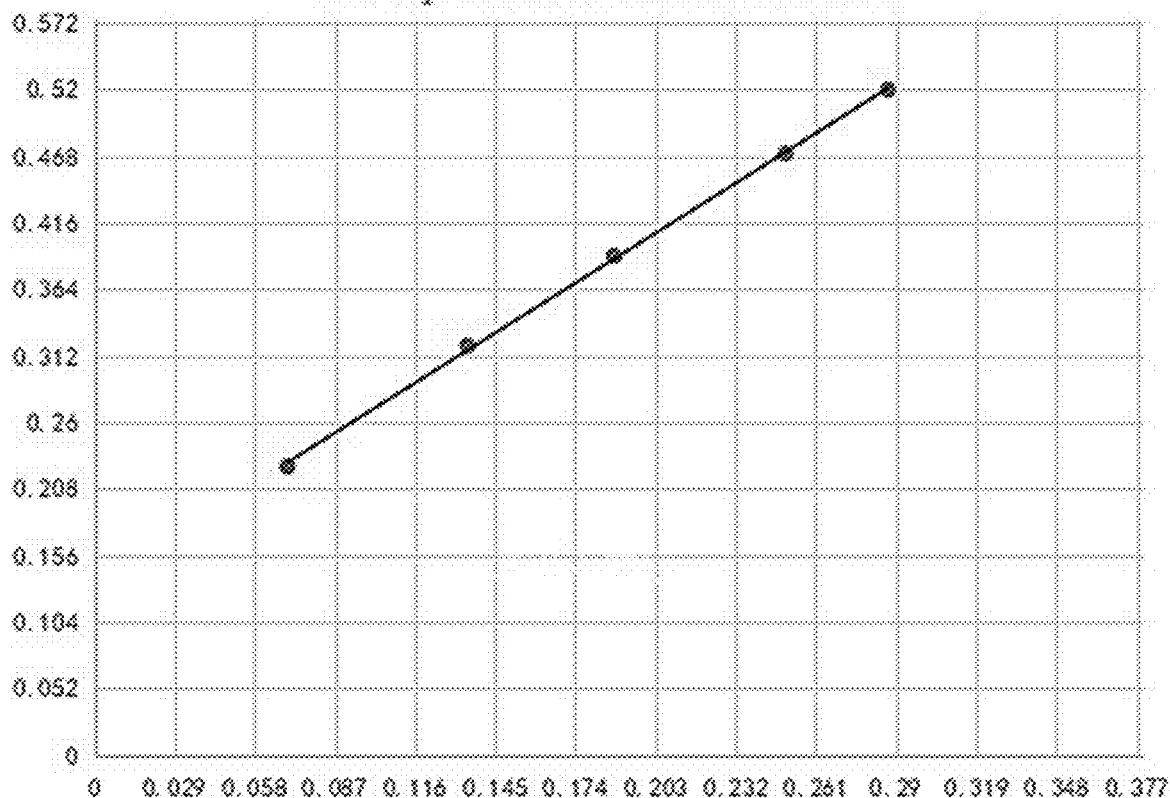
FIG. 1 is a diagram illustrating a specific surface area of a PCB board powder itself following metal leaching according to an example of the present disclosure.
Figure 2:
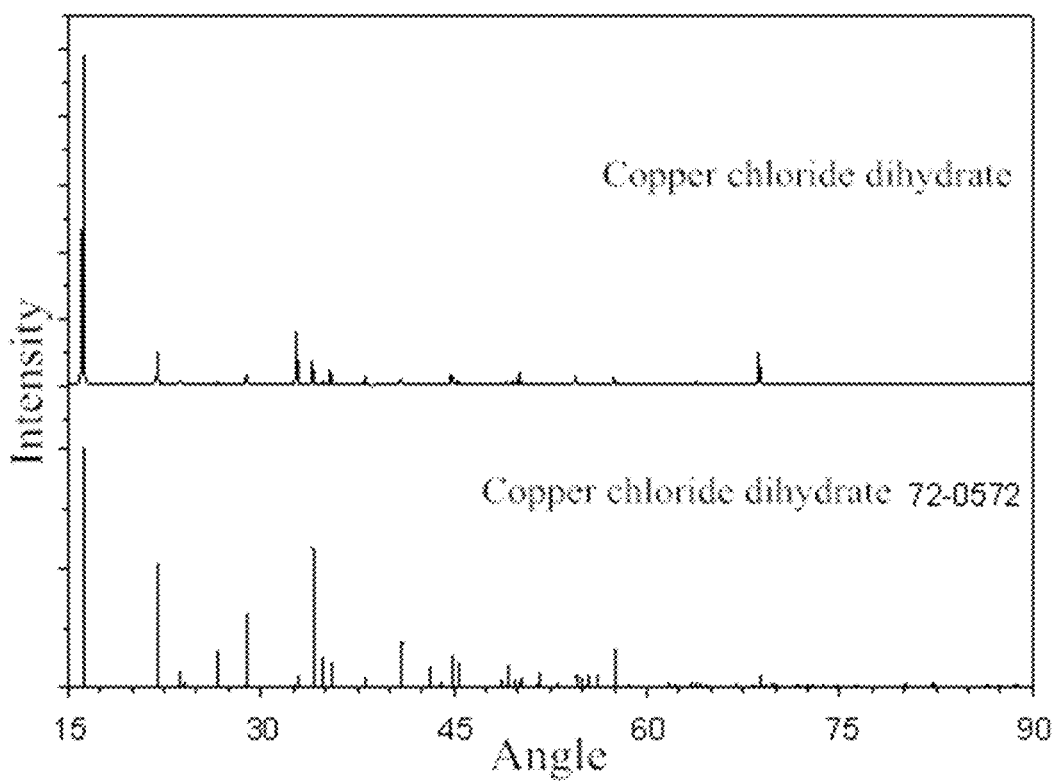
FIG. 2 is an XRD diagram illustrating a copper chloride dihydrate prepared in example 1 of the present disclosure.

The present disclosure will be further described in detail in combination with specific examples. It should be pointed out that the following examples are intended to facilitate the understanding of the present disclosure rather than constitute any limitation hereto. Unless otherwise stated, all technical terms and scientific terms used herein have the same meaning as persons of ordinary skill in the art can understand. In a case of any conflict, the definition of the present specification shall prevail.

The term "prepared by . . . " used herein has the same meaning of the term "containing". The term "containing", "including", "having" or any other variations used herein are intended to cover the non-exclusive inclusion. For example, compositions, steps, methods, products or apparatuses containing listed elements are not necessarily limited to these elements but may include other unlisted elements or elements inherent to the compositions, steps, methods, products or apparatuses.

The conjunction (consisting of . . . ) excludes any elements, steps or components which are not indicated. If it is used in claims, the phrase will enable the claims to be closed type, such that the claims do not include material other than described materials, except normal impurities related hereto. When the phrase "consisting of . . . " appears in a sub-sentence of the subject of the claims rather than immediately after the subject, it only defines elements described in the sub-sentence; other elements are not precluded from the claims as entirety.

When equivalents, concentrations or other values or parameters are expressed by a range, a preferred range or a range defined by a series of upper limit preferred values and lower limit preferred values, it should be understood that all ranges formed by any pairing of an upper limit or preferred value of any range and a lower limit or preferred value of any range are specifically disclosed regardless of whether such range is disclosed separately. For example, when a range of "1 to 5" is disclosed, the described range should be interpreted as including ranges of "1 to 4", "1 to 3", "1 to 2", "1 to 2 and 4 to 5", or "1 to 3 and 5" or the like. When a numerical range is described herein, unless otherwise indicated, the range is intended to include its end values and all integers and fractions within the range.

Example 1

A copper salt used in the example was basic copper chloride, with a mass of 640 g, a copper content of 59.25%, an iron content of 132 mg/kg, a nickel content of 31.9 mg/kg and a zinc content of 2.9 mg/kg.

(1) 640 g of basic copper chloride was obtained and fully dissolved in the first hydrochloric acid solution with a mass of 1152 g and a mass fraction of 30.0% to obtain a copper salt solution.

(2) 5.76 g of a waste PCB board powder was added to the copper salt solution and continuously stirred for 40 min and then the mixed solution was filtered. The filtered solution was subjected to water bath at 90° C. 2.3 g of anhydrous tin chloride was added and continuously stirred for 30 min and then the mixed solution was filtered to obtain a filtrate.

A second hydrochloric acid was added to the filtrate and adjusted to a pH of 1.0 and then the filtrate was maintained at 95° C. The filtrate was evaporated and concentrated to a supersaturated solution. 23 g of copper chloride seed crystal was added and then stirred and cooled for 8 h and then subjected to centrifugal separation to obtain an electronic-grade copper chloride dihydrate.

The copper salt used in the present disclosure is a homemade copper salt with a low impurity content. The copper salt in the example is basic copper chloride, and the impurities in the copper salt are mainly water-insoluble substances and soluble trace heavy metal ions, such as cadmium, iron and nickel where the iron content is high, which directly affects the purity and quality of the copper chloride dihydrate.

In the present disclosure, the copper salt is firstly added to the first hydrochloric acid with a given concentration for dissolution to facilitate subsequent addition of various reactants for reaction so as to remove the water-insoluble substances and the heavy metal ions in the copper salt.

Subsequently, the waste PCB board powder with a main ingredient being epoxy resin is added and continuously stirred and then filtered. In this step, the water-insoluble substances may be removed to obtain a refined copper chloride solution with a turbidity less than 20 NTU. As shown in FIG. 1, unlike the activated charcoal using a surface area to remove impurities by adsorption, the waste PCB board powder added in the present disclosure mainly uses epoxy resin of high adhesion to remove water-insoluble substances, where the polar hydroxyl and ether bond inherent in the molecular chain have strong adhesion to various substances.

Next, under a given temperature, a water bath is performed. Tin chloride compound is added and continuously stirred and then filtered. In this step, trace heavy metal ions in the solution can be removed by co-precipitation separation. The co-precipitation separation method is an effective method to enrich trace components. In this method, when a main precipitate in a solution is separated out, some trace components coexisting with the main precipitate are carry-precipitated so as to achieve separation. In the water bath process, the tin chloride compound is added and hydrolyzed under high temperature to yield a water-insoluble precipitate tin hydroxide and hydrochloric acid. When separated out from the solution, the precipitate tin hydroxide, at the same time, forms co-precipitation with the trace metal ion compounds hydrolyzed in the solution. Thus, the trace metal ions are separated out from the filtrate, thus achieving the purpose of removing the heavy metal impurities.

Figure 3:
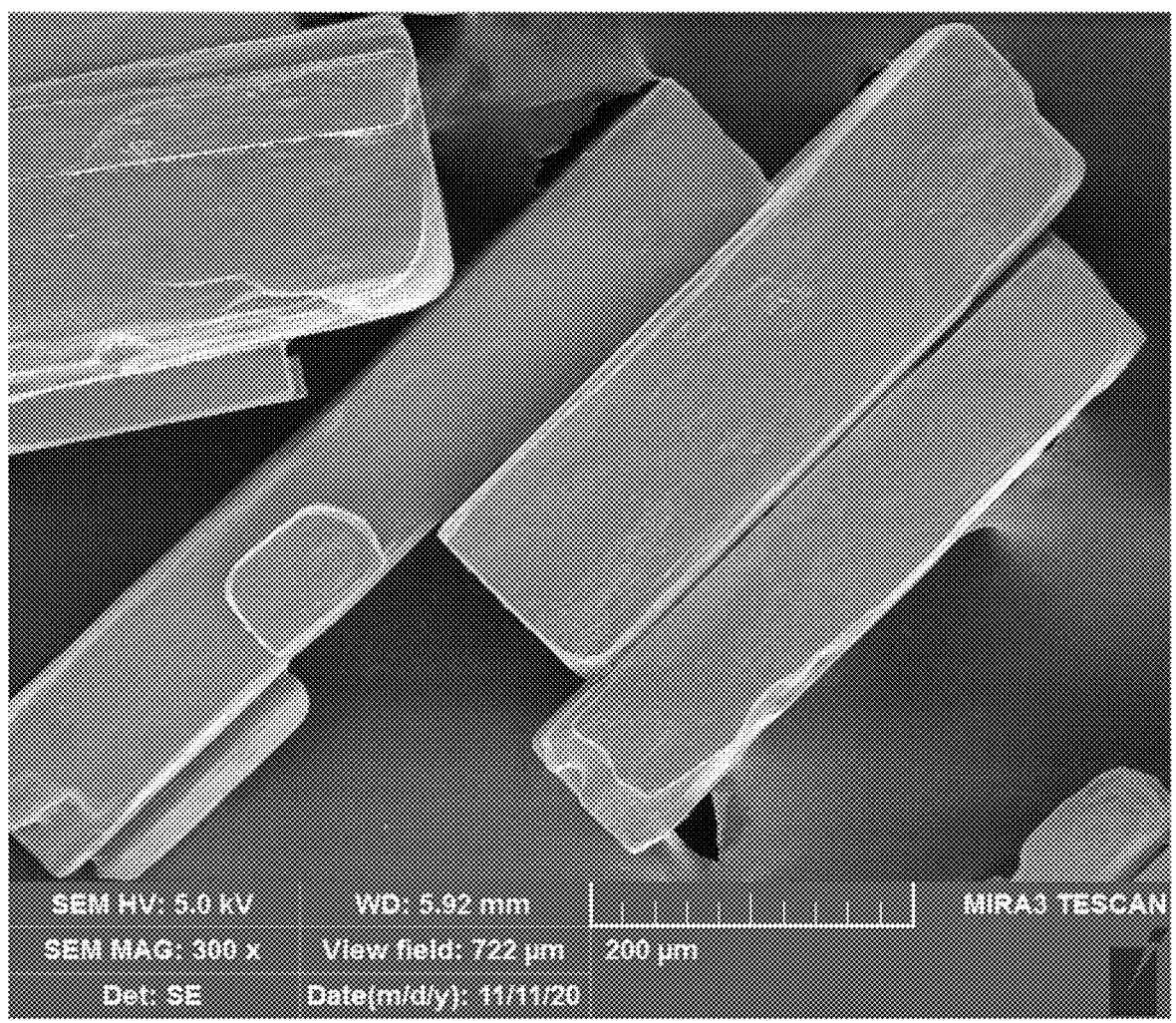
FIG. 3 is an SEM diagram illustrating a copper chloride dihydrate prepared in example 1 of the present disclosure.

Finally, a second hydrochloric acid is added to the filtrate, adjusted in pH to be strongly acidic, evaporated and concentrated to a supersaturated solution, added with copper chloride seed crystal, and cooled and crystallized to enable copper chloride to be separated out from the filtrate. As shown in FIG. 3, finally, an electronic-grade copper chloride dihydrate is obtained by centrifugation. The excess tin chloride compound will be partially hydrolyzed in the solution to yield a precipitate tin hydroxide and hydrochloric acid. By adding the second hydrochloric acid, the filtrate is adjusted in pH to be strongly acidic so as to promote the hydrolysis reaction to move toward formation of the tin chloride compound. Thus, the precipitate tin hydroxide is completely dissolved in the filtrate. The addition of copper chloride seed crystal may improve the crystallization rate of copper chloride in the filtrate.

Example 2

A copper salt used in the example is copper hydroxide, with a mass of 195 g, a copper content of 64.23%, an iron content of 103 mg/kg, a nickel content of 13 mg/kg and a zinc content of 9.6 mg/kg.

The example differs from the example 1 in that: in step (1), the obtained copper salt is copper hydroxide with a mass of 195 g, the first hydrochloric acid has a mass of 1060 g and a mass fraction of 12.67%; in step (2), the added waste PCB board powder has a mass of 21 g, the continuous stirring time after the waste PCB board powder is added is 10 min, the water bath temperature is 80° C., the added tin chloride compound is tin tetrachloride tetrahydrate with a mass of 3.2 g, and the stirring time after the tin chloride compound is added is 120 min; in step (3), pH is adjusted to 1.5, the evaporation and concentration temperature is 80° C., the mass of the added copper chloride seed crystal is 32 g, and the stirring and cooling time is 7 h.

Example 3

A copper salt used in the example is copper oxide, with a mass of 298 g, a copper content of 78.04%, an iron content of 126 mg/kg, a nickel content of 16 mg/kg and a zinc content of 11.8 mg/kg.

The example differs from the example 1 in that: in step (1), the obtained copper salt is copper oxide with a mass of 298 g, the first hydrochloric acid has a mass of 1110 g and a mass fraction of 21.7%; in step (2), the added waste PCB board powder has a mass of 16.7 g, the continuous stirring time after the waste PCB board powder is added is 20 min, the water bath temperature is 60° C., the added tin chloride compound is tin dichloride tetrahydrate with a mass of 4.4 g, and the stirring time after the tin chloride compound is added is 90 min; in step (3), pH is adjusted to 0.75, the evaporation and concentration temperature is 85° C., the mass of the added copper chloride seed crystal is 5.55 g, and the stirring and cooling time is 6 h.

Example 4

A copper salt used in the example is basic copper carbonate, with a mass of 587 g, a copper content of 55.82%, an iron content of 68 mg/kg, a nickel content of 1.5 mg/kg and a zinc content of 14 mg/kg.

The example differs from the example 1 in that: in step (1), the obtained copper salt is basic copper carbonate with a mass of 587 g, the first hydrochloric acid has a mass of 1130 g and a mass fraction of 25.3%; in step (2), the added waste PCB board powder has a mass of 13.56 g, the continuous stirring time after the waste PCB board powder is added is 30 min, the water bath temperature is 70° C., the added tin chloride compound is anhydrous tin dichloride with a mass of 5.65 g, and the stirring time after the tin chloride compound is added is 60 min; in step (3), pH is adjusted to 0.5, the evaporation and concentration temperature is 70° C., the mass of the added copper chloride seed crystal is 33.9 g, and the stirring and cooling time is 2 h.

In the examples 1 to 4 of the present disclosure, the used copper salts, and their contents and ingredients are indicated in the table below:

| Copper salt | Mass (g) | Copper (%) | Iron (mg/kg) | Nickel (mg/kg) | Zinc (mg/kg) |
|---|---|---|---|---|---|
| Basic copper chloride | 640 | 59.25 | 132 | 31.9 | 2.9 |
| Copper hydroxide | 195 | 64.23 | 103 | 13 | 9.6 |
| Copper oxide | 298 | 78.04 | 126 | 16 | 11.8 |
| Basic copper carbonate | 587 | 55.82 | 68 | 1.5 | 14 |

After the process treatment of the present disclosure, an inductively coupled plasma optical emission spectrometer is used to detect the copper chloride dihydrate and its major metal ion impurities in the examples 1 to 4 with the detection results indicated in the table below.

| Detected substances | copper chloride dihydrate (%) | Nickel (mg/kg) | Arsenic (mg/kg) | Calcium (mg/kg) | Cadmium (mg/kg) | Cobalt (mg/kg) | Magnesium (mg/kg) | Manganese (mg/kg) | Lead (mg/kg) | Iron (mg/kg) | Zinc (mg/kg) |
|---|---|---|---|---|---|---|---|---|---|---|---|
| Example 1 | 99.17 | 1.61 | 4.2 | <5 | <0.1 | <0.5 | <2.3 | <3.1 | <5 | <5 | <1.2 |
| Example 2 | 99.04 | 0.96 | 3.77 | | | | | | | | |
| Example 3 | 99.21 | 2.09 | 4.22 | | | | | | | | |
| Example 4 | 99.08 | 1.3 | 3.2 | | | | | | | | |

The copper salt used in the present disclosure is a homemade copper salt with low impurity content. The copper content in the copper salt is 55% to 78%, and the impurities in the copper salt are mainly water-insoluble substances and soluble trace heavy metal ions, such as cadmium, iron and nickel and zinc, where the iron content is high, which directly affects the purity and quality of the copper chloride dihydrate. After treatment of the preparation process in the above examples is performed, the content of the copper chloride dihydrate in the copper chloride dihydrate product reaches 99% or higher. In the impurities of the copper chloride dihydrate product, the content of nickel ≤2.09 mg/kg, the content of arsenic ≤4.22 mg/kg and the contents of other impurities are all less than a minimum value measured by the apparatus, that is, in the examples 1 to 4, other impurities in the above table are not detected.

In conclusion, with a copper salt as a raw material, the present disclosure performs hydrochloric acid dissolution, two solid-liquid separations, evaporation concentration and cooling crystallization to remove water-insoluble substances and trace heavy metal elements in the copper salt so as to prepare a high purity electronic-grade copper chloride dihydrate product, thus significantly improving the product quality of the copper chloride dihydrate. The content of the copper chloride dihydrate in the product reaches 99%, and thus the present disclosure has the advantages of no introduction of new impurities, good impurity removal effect, simple process operation, no environmental pollution and industrial applicability.

The above examples are used only to show some implementations of the present disclosure which are described specifically and in details, but these examples shall not be understood as limitation to the present disclosure. It should be pointed out that several variations and improvements made by those skilled in the art without departing from the idea of the present disclosure shall fall within the scope of protection of the present disclosure. Thus, the scope of protection of the present disclosure is indicated by the appended claims.

What is claimed is:

1. A method of preparing an electronic-grade copper chloride dihydrate, comprising the following steps:
    (1) dissolving a copper salt in a first hydrochloric acid solution to obtain a copper salt solution;
    (2) performing two solid-liquid separations for the copper salt solution to obtain a filtrate;
    wherein, the two solid-liquid separations do not have sequence and include an adhesive separation and a co-precipitation separation;
    the adhesive separation is a solid-liquid separation performed by adding a waste printed circuit board (PCB) powder and continuously stirring, wherein the waste PCB powder comprises epoxy resin;
    the co-precipitation separation is a solid-liquid separation performed by adding tin chloride compound and continuously stirring, wherein the co-precipitation separation proceeds in a water bath of 60° C. to 90° C.;
    (3) adding a second hydrochloric acid into the filtrate and adjusting pH to 0.1 to 2.5 and then performing evaporation concentration to a supersaturated solution, adding copper chloride seed crystal and then performing cooling crystallization and centrifugal separation to obtain an electronic-grade copper chloride dihydrate product.

2. The method of claim 1, wherein the copper salt is at least one of copper oxide, copper hydroxide, basic copper chloride and basic copper carbonate.

3. The method of claim 1, wherein a mass concentration of the first hydrochloric acid is 5.0% to 30.0%.

4. The method of claim 1, wherein a molar ratio of the first hydrochloric acid to the copper salt is 1.70 to 2.30:1.

5. The method of claim 1, wherein a metal content of the waste PCB powder is lower than 0.1 mg/kg, and an addition amount of the waste PCB powder is 0.5% to 12% of the mass of the copper salt dissolved in the first hydrochloric acid.

6. The method of claim 1, wherein the addition amount of the tin chloride compound is 0.1% to 2% of the mass of the copper salt dissolved in the first hydrochloric acid, and the tin chloride compound is at least one of $SnCl_4$ and $SnCl_2$.

7. The method of claim 1, wherein an evaporation temperature is 65° C. to 95° C. when the filtrate is concentrated to the supersaturated solution.

8. The method of claim 1, wherein the addition amount of the copper chloride seed crystal is 1% to 18% of the mass of the copper salt dissolved in the first hydrochloric acid.

9. The method of claim 8, wherein after the copper chloride seed crystal is added, the supersaturated solution is cooled down to 5° C. to 50° C. with a cooling time no less than 2 h.

10. The method of claim 1, wherein a rotation speed of the centrifugal separation is 800 to 4000 r/m.

* * * * *